July 17, 1928.

T. C. LEAKE

TRACTOR

Filed June 27, 1922

INVENTOR
Thomas C. Leake,
BY
Duell, Warfield & Duell
ATTORNEY

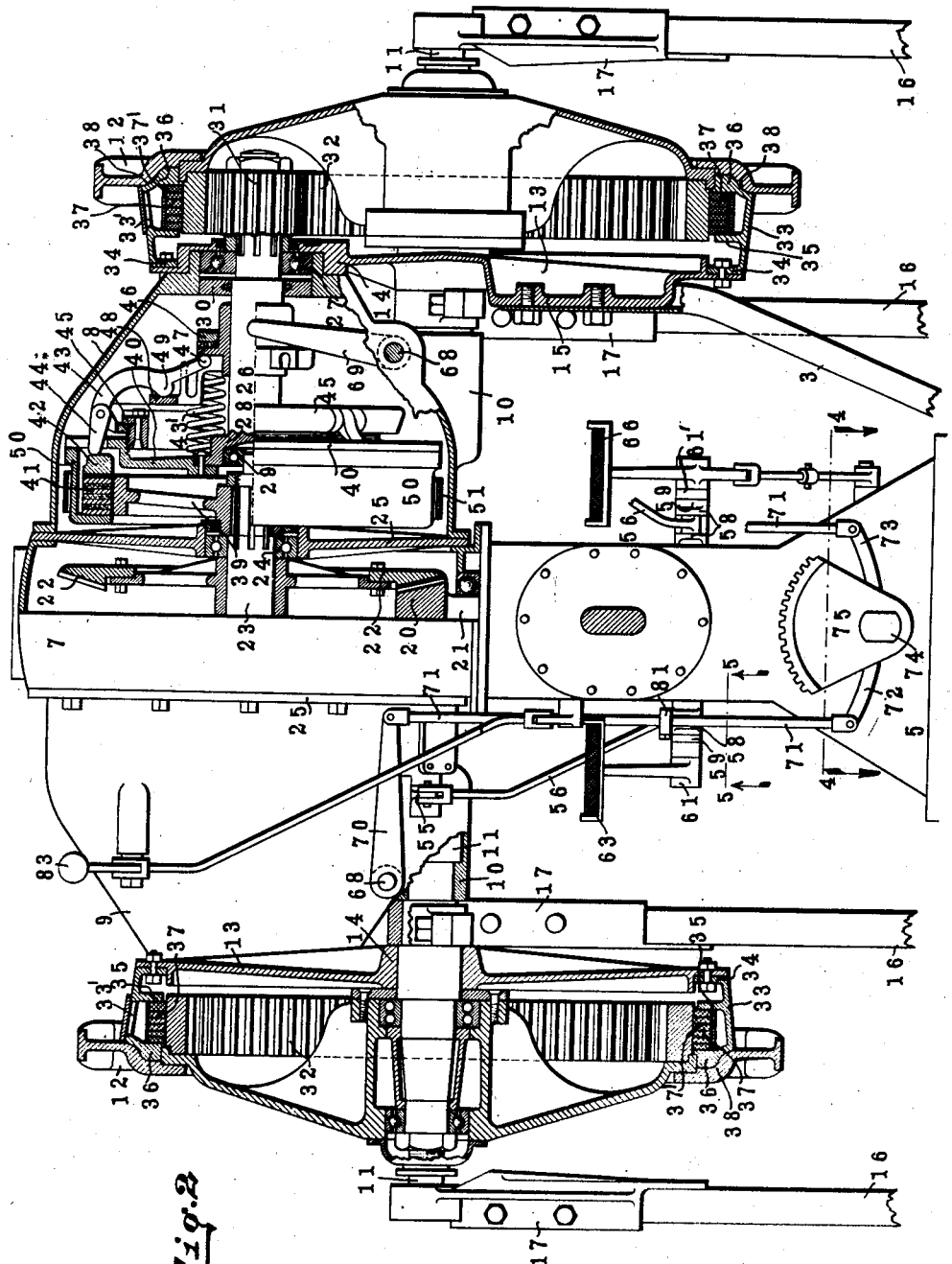

July 17, 1928.
T. C. LEAKE
1,677,878
TRACTOR
Filed June 27, 1922
4 Sheets-Sheet 3
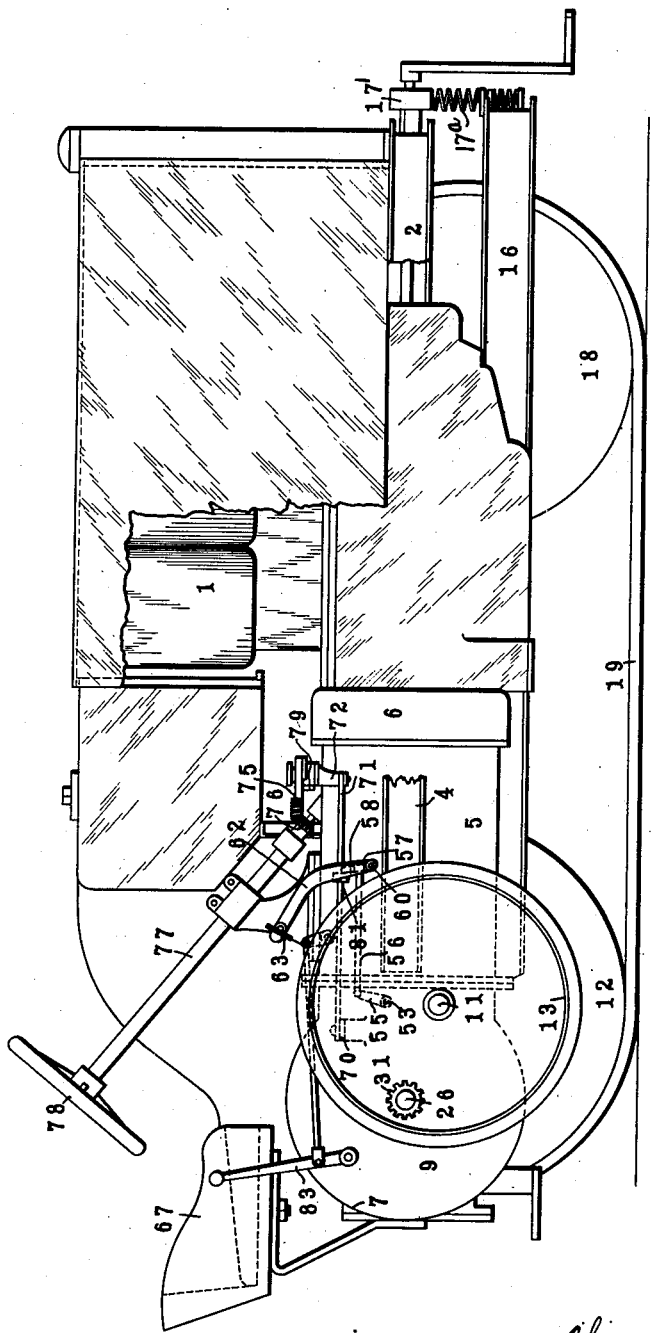
INVENTOR
Thomas C. Leake,
BY
Duell, Warfield
ATTORNEY July 17, 1928.                               1,677,878
T. C. LEAKE
TRACTOR
Filed June 27, 1922        4 Sheets-Sheet 4
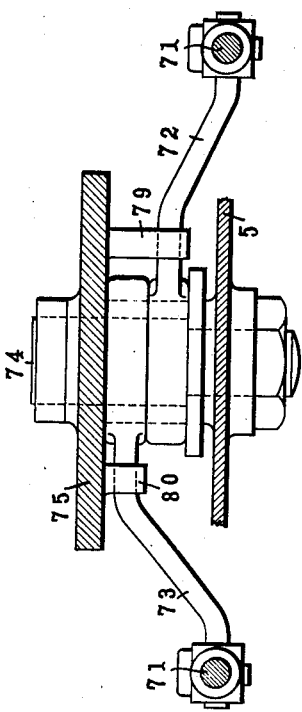
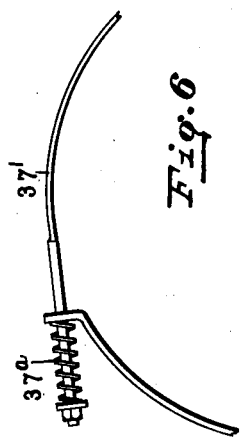
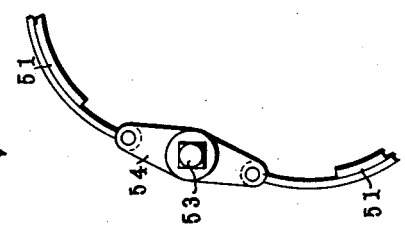
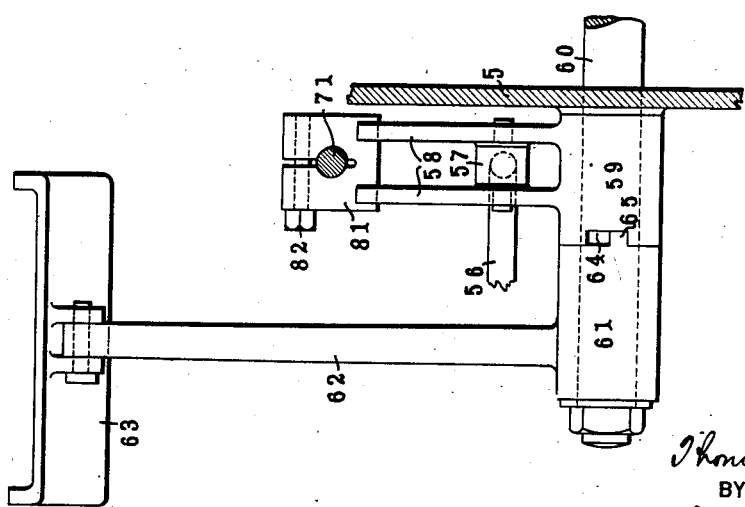
INVENTOR
Thomas C. Leake
BY
Duell, Warfield and Duell
ATTORNEY Patented July 17, 1928.

1,677,878

UNITED STATES PATENT OFFICE.

THOMAS C. LEAKE, OF NEW YORK, N. Y., ASSIGNOR TO BEAR TRACTOR CORPORATION OF AMERICA, OF NEW YORK, N. Y., A CORPORATION OF DELAWARE.

TRACTOR.

Application filed June 27, 1922, Serial No. 571,308, and in Great Britain February 2, 1923.

This invention relates to tractors, and more particularly, in some of its details to the endless-chain track-laying type of tractors.

The invention has for its general object an improved construction and arrangement of parts resulting in a tractor which is durable and effective in service and economical from a manufacturing standpoint.

Another object is to provide an improved arrangement for driving and controlling the movement of the track-laying mechanism.

Still another object is to provide improved guiding and steering mechanism for tractors of the class mentioned.

Another object is to provide an improved brake control and actuating means therefor.

Other objects and advantages will be in part obvious in connection with the following detailed description of an illustrative embodiment of the invention and will be in part pointed out in connection therewith.

The invention accordingly consists in the features of construction, combinations of elements and arrangement of parts which will be exemplified in the construction hereinafter set forth, and the scope of the application of which will be indicated in the following claims.

For a more complete understanding of the nature and advantages of the invention reference should be had to the following detailed description setting forth the best embodiment at present known, taken in connection with the accompanying drawings in which—

Fig. 2 is an enlarged fragmentary plan view, parts being shown in section;

Fig. 3 is a side elevation, certain parts being broken away for clearness of disclosure;

Fig. 4 is an enlarged detail sectional view taken approximately on the line 4—4 of Fig. 2 looking in the direction of the arrows;

Fig. 5 is an enlarged sectional view on the line 5—5 of Fig. 2;

Fig. 6 is a fragmentary view of a detail, and

Fig. 7 is a detail of the brake-band operating means.

Figure 1:
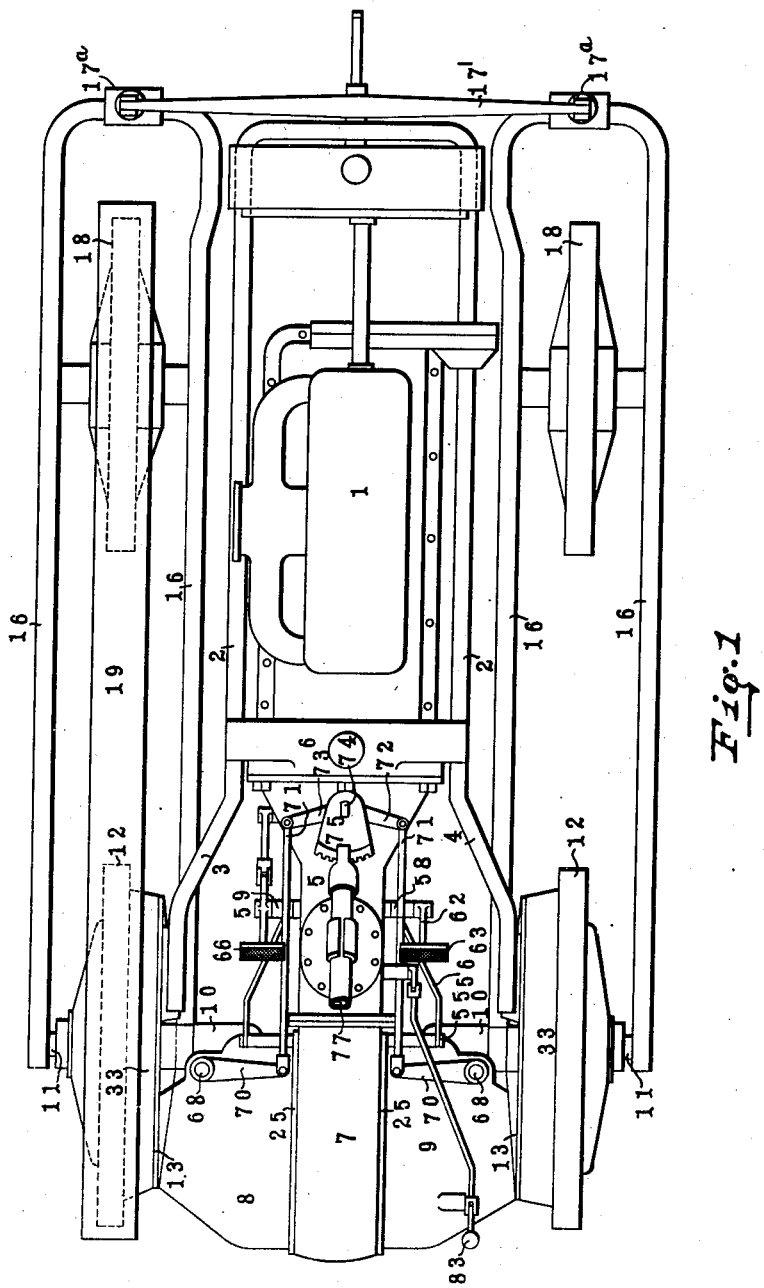
Figure 1 is a plan view of a tractor of the flexible tread type equipped with the invention, certain parts being removed and others being diagrammatically shown for clearness and simplicity of illustration.

Referring now to the drawing for a detailed description of the embodiment shown, a tractor of the flexible tread type is shown having an internal combustion engine 1 for generating power for driving the tractor. This engine is mounted upon a main tractor frame 2, generally of U-shape, with a forwardly disposed bow and rearwardly extending diverging legs 3 and 4. A transmission gear housing 5 is secured to the rear of the crank-casing of the engine, and forwardly of this housing is disposed the housing 6 for the main driving clutch. To the gear-transmission housing is secured the driving gear housing 7 and bolted at opposite sides of this are laterally disposed conical casings 8 and 9 for housing the controlling power-transmission connections. This housing construction is fully set forth in co-pending application Serial No. 506,637, filed October 10, 1921, and need not be herein described in further detail.

Each of the conical housings 8 and 9 has an integral formation 10 supporting a stub-shaft or axle 11 on which is rotatively mounted a driving sprocket or traction member 12. A guard-plate 13 is also mounted on each of said axles by means of an apertured central hub 14, the guard being disposed in juxtaposition to the respective traction member 12 and co-operating with the latter to provide a housing for the driving gears of the traction member. The rearward extensions 3 and 4 of the main power-unit frame 2 are bolted to and supported by the guard-plates, integrally offset bosses 15 being formed on the latter for this purpose.

Pivoted track frames 16 disposed at a lower level than frame 2 and at opposite sides of the tractor are also supported at their rear ends on the axles 11, these frames comprising channel members bent into U-form, the legs thereof extending rearwardly. Terminal castings 17 are secured to the rearwardly extending legs of these frames forming pivotal connections with the axles 11. The forward ends of the track frames are flexibly connected to the main frame by means of an equalizing bar 17', connected near its center of length to the main frame and at opposite ends thereof it is flexibly connected as at 17ª to the forward ends of the respective track frames. Idler sprockets 18 are rotatively supported near the forward or bow ends of the U-shaped track frames and the flexible traction threads 19 (shown diagrammatically in Fig. 1) are supported at opposite sides of the tractor by the idler and rear driving sprocket 12. This arrangement provides a flexible frame structure permitting pivotal movement in vertical planes of the track frames, enabling the tractor to operate over rough and uneven surfaces while maintaining its proper traction engagement with the surface over which it passes, so the tractor performs effectively its required functions.

Driving mechanism for each of the sprockets 12 includes a pinion 20 mounted on the main engine driving shaft 21 through transmission gearing (not shown) housed in casing 5. The pinion 20 meshes with a beveled gear 22 rigidly mounted on a shaft 23 rotatable in bearings 24, supported in walls 25 of the housings 7, 8 and 9. Controlling power transmission connections are arranged on either side of the tractor for transmitting energy to the respective driving sprockets. As these connections are substantially the same at both sides of the tractor, a description of that at one side will be sufficient.

Aligned with the shaft 23 is a power-transmission shaft 26 supported at its outer end in a bearing 27 in the outer end of the conical housing. At its inner end the shaft 26 is socketed, as at 28, for receiving a bearing 29 supported on the reduced end of the shaft 23. This bearing supports the inner end of the shaft 26 and permits relative rotative movement of shafts 23 and 26. A guard-plate 30 surrounds the shaft 26 adjacent the outer bearing thereof, providing a tight joint and preventing passage of moisture, oil, or dirt. The outer end of the shaft 26 carries a pinion 31 meshing with an internally-toothed gear 32 rigidly secured to the sprocket 12, the driving gear and pinion being housed within the cavity formed in the sprocket and protected by the guard-plate 13.

In order to provide a dust-proof housing for these driving gears, there is a tight joint between the sprocket and the guard-plate, as shown in Fig. 2. An annular plate 33 is securely bolted to the guard plate through an inwardly extending marginal flange 34, and additional inwardly extending flanges 35 and 36 provide supports for packing 37 disposed therebetween, and engaging the smooth outer surface of the gear 32. This packing is held in position by a metallic band 37' having a flexible adjustment 37ᵃ between the ends thereof, as shown in Fig. 6. This adjusting connection is accessible for adjustment through an opening 33' and the plate 33. By this means the packing is held firmly in position between flanges 35 and 36 and in close engagement with the periphery of the driving gear. The outer flange 36 is formed to slidably engage with the rotary tread-supporting rim 38 of the sprocket, this rim having a complementary formation co-operating with the flange. The rim 38 is fixed in position to the outwardly dished or trussed disc of the sprocket, as shown in Fig. 2.

At the outer end of the shaft 23 is secured a clutch disc 39. On the adjacent end of the shaft 26 a complementary clutch disc 40 is secured so as to lie adjacent the clutch disc 39. This assembly provides a clutch which may be termed a controlling or steering clutch. The friction elements 41 of this clutch are arranged to be engaged by a clutch ring 42, the latter being operatively engaged by equally spaced operating levers 43 having camming noses 44 contacting with the ring. There are preferably three of these operating levers for each clutch, spaced 120 degrees apart. The operating levers are pivotally supported on a ring 45 carried by the clutch disc 40, and the friction elements of the clutch are held in position to set the clutch by compression springs 43' stressed against the inwardly extending ends of the levers. These ends are operatively connected to an operating ring 46 slidably mounted on shaft 26 and having a shoulder engaging extensions 47 of the levers. This ring also carries a fulcrum plate 48 for engaging the shoulders 49 of the levers. It will be seen that movement of the sliding ring 46 outwardly under the influence of the springs 43' will bring the fulcrum plate 48 against the shoulder 49 to set the clutch so the shafts 23 and 26 are locked together for rotation in unison. Movement of the ring 46 inwardly, by means of an operating mechanism hereinafter described, results in opposite movement of the levers 43, releasing the frictional engagement between the clutch discs and cutting off the transmission of power to the driving sprocket 12.

The clutch disc 40 is bolted to the end of shaft 26, as shown in Fig. 2, and has an annular drum 50 with a peripheral friction seat for a brake band 51. This clutch disc is also provided with an annular flange extending inwardly from the drum 50 forming a seat for the friction elements of the clutch. The brake band 51 is operated by a brake shaft 53 having a knuckle 54 connected to opposite ends thereof (see Figs. 3 and 7). A crank lever 55 is connected with the brake shaft, and a link 56 connects this lever with operating mechanism shown particularly in Figs. 2, 4 and 5. It will be understood that a brake link 56 is provided at each side of the housing 5 for operation of the brake mechanism for each driving sprocket.

The forward end of each link 56 is connected as at 57 to a crank arm 58, rotatably mounted by means of a hub 59 on a transversely extending shaft 60 rotatably mounted in the housing 5. A hub 61, non-rotatably mounted on shaft 60 adjacent hub 59 as shown in Fig. 5, carries an operating lever 62 and a foot pedal 63 for manual operation as shown in Fig. 2. It will be understood that a hub 61' corresponding to and spaced from the pedal hub 61 is also non-rotatably secured to the shaft 60 and lies adjacent the corresponding rotatable hub 59, but is not provided with an operating pedal. Each hub 59 has a slot 64 lying adjacent the hub 61 and receiving a lug 65 formed on the latter, as particularly shown in Fig. 5. By this connection both of the hubs 59 and consequently the corresponding brake mechanisms may be simultaneously operated by the brake pedal 63, while either of the crank arms is permitted to move forwardly independently of the shaft 60 and hubs 61 for a limited distance. The pedal 66, with connections shown in Fig. 2, is designed to operate the main clutch of the power-transmission which is housed in the casing 6.

The steering clutches are manually controlled by mechanism under the control of the operator stationed in a seat 67 at the rear end of the tractor. This steering mechanism includes shafts 68 mounted in vertical position in the housings 8 and 9, extending through the latter. Each shaft carries an arm 69 mounted within the casing and lying in position to contact with the sliding sleeve 46. An external arm 70 is also mounted on each shaft 68, being connected to a tension link 71. These tension links 71 are connected at their forward ends to arms 72 and 73 pivoted on a stud 74 mounted on the casing 5. This stud, as particularly shown in Fig. 4, also rotatably supports a gear sector 75 having teeth meshing with a beveled gear 76 carried by a shaft 77 forming a part of the steering column. The steering shaft is provided with a hand wheel 78 positioned conveniently for access from the operator's station. The sector 75 carries on its underside lugs 79 and 80 lying in position to contact respectively with the arms 72 and 73, so that arm 72, and consequently its corresponding clutch are operated when the steering wheel is turned in one direction, and the opposite clutch will be operated when the steering wheel is turned in the opposite direction.

A lug 81 is slidably mounted on each of the tension rods 71 for longitudinal adjustment and is adapted to be clamped in adjusted position by means of a screw 82. Each block 81 lies in position to contact with the respective crank lever 59 and the latter is carried forwardly after a predetermined movement of the rod 71, and the corresponding brake-band 51 will be tightened to apply the brake after the release of the clutch.

The operation of the invention, which should be clear from the foregoing detailed description, briefly is as follows:

When the engine is running and the main driving clutch engaged, and the power transmission gears (not shown) are placed in driving engagement by means of the gear shift lever 83, the driving shaft 23, and consequently the driving sprockets 12 and flexible traction treads will be operated to move the tractor forwardly. When it is desired to restrain the forward or backward movement of the tractor, brake effort is applied to the flexible treads 19 by pushing the brake pedal 63 forwardly. This movement brings the lugs 65 on the hub 61 into engagement with the shoulder at the forward ends of the slots 64, moving the crank levers 58 forwardly and tightening the brakebands. During this movement the crank levers 58 move away from the blocks or lugs 81, so there is no result of movement of the clutch operating mechanism, both steering clutches consequently remaining set. When it is desired to steer the tractor, say, to the left, the hand wheel 78 is turned to the left, moving the sector 75 to bring the short lug 79 into engagement with the lever 73 and move the latter to release the steering clutch at the left side of the tractor. This cuts off the transmission of power to the left tractor tread while the power still continues to be applied to the right tread. The result of this is that the tractor immediately begins to swing to the left. If desired to turn on a shorter radius the steering wheel is turned still further to the left, until the block 81 contacts with the crank lever 58, moving it to tighten the left brakeband 51 and restraining the movement of the left traction tread. This movement of the crank lever is permitted without moving the shaft 60 or the opposite crank lever because of the lost motion connection between the hubs 59 and 61 provided by the slots 64 and lugs 65; only the brake at the left side will thus be applied. It is also obvious that the brakes at both sides may be simultaneously applied when the steering clutch at one side is released, and the tractor may be brought to a stand-still while turning in either direction.

Since many changes could be made in the above construction and different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is:

1. In a tractor, in combination, traction elements, brake mechanism for each of said traction elements, clutch mechanism for each of said traction elements, an operating link connected with each of said brake and clutch mechanisms, a rotary brake shaft having crank arms thereon operatively connected respectively to said brake operating links, a foot pedal connected to operate said brake shaft to simultaneously apply said brake mechanisms, a lost motion connection between each of said clutch operating links and the corresponding brake operating link, a steering shaft having an operating hand wheel thereon and connections between said steering shaft and said clutch operating links for alternate operation thereof to control said clutch mechanisms and to said brake operating links for operation of said brake mechanisms through said lost motion connections in sequence to said clutch operation.

2. In a tractor, in combination, traction elements, brake mechanism for each of said traction elements, clutch mechanism for each of said traction elements, a brake shaft, levers loosely mounted on said brake shaft for rotary movement relatively thereto, connections cooperating with said levers for alternate operation of said clutch mechanisms and sequential operation of the corresponding brake mechanism, and means cooperating with said levers for simultaneously applying said brake mechanisms independently of the clutch mechanisms.

3. In a tractor, in combination, traction elements for said tractor, means for driving said traction elements, braking means for each of said traction elements including a brake shaft, a steering shaft having a steering hand wheel thereon and being connected to said braking means for alternately applying the same to steer the tractor, crank arms mounted on said brake shaft and connected to said braking means, and a pedal mechanism mounted on said brake shaft and having lost motion connections with said crank arms for simultaneous application of said braking means.

4. In a tractor, in combination, traction elements for said tractor, means for driving said traction elements including a brake shaft, braking means for each of said traction elements, a steering shaft having a steering hand wheel thereon and being connected to said braking means for alternately applying same to steer the tractor, crank arms mounted on said brake shaft and connected to said braking means, a pedal mechanism mounted on said brake shaft and having lost motion connections with said crank arms, and adjustable blocks on said steering shaft connections for contacting with said crank arms.

5. In a tractor, in combination, spaced traction members, power transmission connections for each of said traction members, brake mechanism and clutch mechanism associated with each of said traction members, a steering element, connections to said steering element for alternate operation of said clutch mechanisms, a brake lever, connections including an independently movable crank arm between each of said brake mechanisms and said brake lever for simultaneous application of said brake mechanisms, said crank arms each having a lost motion operating connection with said brake lever, and lost motion connections between said clutch operating connections and said independently movable crank arms for alternate operation of said brake mechanisms in sequence to the operation of the clutch mechanisms.

6. In a tractor, in combination, traction elements, brake mechanism for each of said traction elements, clutch mechanism for each of said traction elements, a brake shaft, levers loosely mounted on said brake shaft, connections between said levers and said brake mechanisms, a steering member, operating connections from said steering member to said clutch mechanisms, and lost motion connections between said levers and said clutch operating connections.

7. In a tractor, in combination, traction elements, brake mechanism for each of said traction elements, clutch mechanism for each of said traction elements, a brake shaft, levers loosely mounted on said brake shaft, connections between said levers and said brake mechanisms, a steering member, operating connections from said steering member to said clutch mechanisms, and lost motion connections between said steering member and said levers including adjustable blocks adapted to contact with said levers.

8. In a tractor, in combination, traction elements, brake mechanism for each of said traction elements, clutch mechanism for each of said traction elements, a brake shaft, levers loosely mounted on said brake shaft, connections between said levers and said brake mechanisms, a steering member, operating connections from said steering member to said clutch mechanisms, lost motion connections between said levers and said clutch operating connections, a brake lever, and lost motion connections between said brake lever and said loosely mounted lever.

9. In a tractor, in combination, traction elements, brake mechanism for each of said traction elements, clutch mechanism for each of said traction elements, a brake shaft, levers loosely mounted on said brake shaft, connections between said levers and said brake mechanisms, a steering member, operating connections from said steering member to said clutch mechanisms, lost motion connections between said steering member and said levers including adjustable blocks adapted to contact with said levers, a brake lever, and lost motion connections between said brake lever and said loosely mounted levers.

10. In a tractor, in combination, traction elements, brake mechanisms for each of said traction elements, clutch mechanism for each of said traction elements, a brake shaft, levers loosely mounted on said brake shaft, connections cooperating with said levers for alternate operation of said clutch mechanisms and sequential application of said brake mechanisms, and a brake pedal mounted on said brake shaft and having lost motion connection with said levers for operation of said brake mechanisms.

11. In a tractor, in combination, traction elements, clutch mechanism for each of said traction elements, a steering column including a rotary steering shaft having at one end thereof an operating hand member, a rotary gear sector mounted adjacent to the other end of said shaft, a gear carried by said steering shaft for driving said sector, levers mounted adjacent to said rotary member, connections between each of said levers and one of said clutch mechanisms and means on said rotary member for alternate operation of said levers when said hand wheel is turned in opposite directions.

12. In a tractor, in combination, traction elements, clutch mechanism for each of said traction elements, a steering column including a rotary steering shaft having an operating manual member at its upper end, levers pivotally mounted adjacent to said steering shaft for pivotal movement independently of each other, connections between each of said levers and one of said clutch mechanisms, an operating plate mounted adjacent said steering shaft and connected for operation by said shaft, and operative lugs between said operating plate and each of said pivoted levers to impart alternate independent pivotal movement thereto.

13. In a tractor, in combination, traction elements, a clutch mechanism for each of said traction elements, a steering column including a rotary steering shaft having an operating manual member at the upper end thereof, levers mounted adjacent said steering shaft, connections between each of said levers and one of said clutch mechanisms, a toothed sector, a pinion mounted on said steering shaft for operating said sector, and lugs on said sector for contacting with said levers to impart alternate movement thereto.

14. In a tractor, in combination, traction elements, brake mechanism for each of said traction elements, a brake shaft, crank arms mounted upon said brake shaft and having a lost motion connection therewith, operating connections with each of said crank arms and one of said brake mechanisms, an operating lever for said brake shaft for simultaneous application of said brake mechanisms, and independent actuating connections with each of said crank arms for operating said brake mechanisms in alternation independently of said brake shaft.

15. In a tractor, in combination, a pair of track frames pivotally connected adjacent their ends to the tractor, a main tractor frame, a traction element rotatably mounted adjacent the rear end of said frames, driving connections for said traction element, a guard plate secured to the rearward portion of said main tractor frame and co-operating with said traction element to provide a compartment for housing the driving connections.

16. In a tractor, in combination, a rotary driving member having a driving gear mounted thereon, a trussed disc secured at its periphery to said gear, a traction rim secured to the periphery of said disc, a stationary annular plate having an edge lying closely adjacent said rim and having inwardly directed circumferential ribs, and packing intermediate of and supported by said ribs and forming a tight joint between said plate and the rotary parts of said driving member.

17. In a tractor, in combination, traction elements, brake mechanism for each of said traction elements, a brake shaft, crank arms mounted upon said brake shaft for movement thereon independently of each other, and operatively connected respectively to said brake mechanisms, means for operating said shaft to move said crank arms together for braking and links having contact connection with said crank arms for alternate operation thereof for steering.

18. In a tractor, in combination, traction elements, brake mechanism for each of said traction elements, a brake shaft, independently movable crank arms operatively connected respectively to said brake mechanisms and connected for operation by said brake shaft, means connected to rotate said brake shaft so as to move said crank arms together for braking, links having lost motion contact connection with said crank arms for alternate operation thereof for steering, a steering column including a rotary steering shaft having a manual operating member thereon and operative connections between said links and said steering shaft to effect steering to the right when the manual member is rotated in one direction and to the left when rotated in the opposite direction.

In testimony whereof I affix my signature.

THOMAS C. LEAKE.